United States Patent
Jang et al.

(10) Patent No.: US 9,960,630 B2
(45) Date of Patent: May 1, 2018

(54) WIRELESS POWER CHARGING DEVICE

(71) Applicant: SAMSUNG ELECTRO-MECHANICS CO., LTD., Suwon-si (KR)

(72) Inventors: Jae Hyuk Jang, Suwon-si (KR); Hyun Jung Lee, Suwon-si (KR); Yeong Hwan Song, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 0 days. days.

(21) Appl. No.: 15/173,831

(22) Filed: Jun. 6, 2016

(65) Prior Publication Data
US 2017/0040830 A1 Feb. 9, 2017

(30) Foreign Application Priority Data

Aug. 6, 2015 (KR) .......... 10-2015-0111245
Oct. 12, 2015 (KR) .......... 10-2015-0142029

(51) Int. Cl.
| | |
|---|---|
| H02J 7/02 | (2016.01) |
| H01F 27/28 | (2006.01) |
| H01F 5/06 | (2006.01) |
| H02J 7/00 | (2006.01) |

(52) U.S. Cl.
CPC .............. *H02J 7/025* (2013.01); *H01F 5/06* (2013.01); *H01F 27/288* (2013.01); *H02J 7/0027* (2013.01)

(58) Field of Classification Search
None
See application file for complete search history.

(56) References Cited

U.S. PATENT DOCUMENTS

| | | | | |
|---|---|---|---|---|
| 6,037,400 | A * | 3/2000 | Kitahata | C08K 3/04 524/495 |
| 8,864,748 | B2 * | 10/2014 | Coulthard | A61M 1/0088 602/42 |
| 9,252,611 | B2 * | 2/2016 | Lee | H01F 38/14 |
| 9,392,735 | B2 * | 7/2016 | Jang | B32B 27/08 |
| 9,507,390 | B2 * | 11/2016 | Jang | H05K 9/0075 |
| 9,853,487 | B2 * | 12/2017 | Song | H02J 7/025 |
| 2008/0085426 | A1 * | 4/2008 | Kurita | G11B 5/66 428/828.1 |
| 2009/0096996 | A1 * | 4/2009 | Kim | G03B 21/16 353/52 |
| 2011/0186324 | A1 * | 8/2011 | Hur | H05K 9/0098 174/34 |

(Continued)

FOREIGN PATENT DOCUMENTS

| | | |
|---|---|---|
| JP | 2007-128977 A | 5/2007 |
| JP | 2009-4513 A | 1/2009 |

(Continued)

OTHER PUBLICATIONS

Derwent Abstract of WO 2014/137151 A1 (pub. 2014).*

(Continued)

*Primary Examiner* — Kevin M Bernatz
(74) *Attorney, Agent, or Firm* — NSIP Law

(57) ABSTRACT

A wireless power charging device includes a coil configured to transmit or receive a wireless power signal; an electromagnetic wave shielding sheet disposed proximate the coil; and, a heat radiation layer disposed on the electromagnetic wave shielding sheet.

15 Claims, 4 Drawing Sheets

(56) References Cited

U.S. PATENT DOCUMENTS

| | | | | |
|---|---|---|---|---|
| 2012/0057322 | A1* | 3/2012 | Waffenschmidt | H01F 27/365 361/816 |
| 2013/0114165 | A1* | 5/2013 | Mosendz | G11B 5/65 360/244 |
| 2013/0240261 | A1* | 9/2013 | Song | H05K 9/0075 174/391 |
| 2014/0070763 | A1* | 3/2014 | Chiles | H01F 38/14 320/108 |
| 2014/0167522 | A1* | 6/2014 | Lee | H01F 38/14 307/104 |
| 2014/0216807 | A1* | 8/2014 | Liu | H05K 9/0088 174/358 |
| 2014/0306653 | A1* | 10/2014 | Hirobe | H01F 38/14 320/108 |
| 2015/0123860 | A1* | 5/2015 | Park | H01Q 1/22 343/720 |
| 2016/0057900 | A1* | 2/2016 | Polak | H01F 27/365 320/108 |
| 2016/0064814 | A1* | 3/2016 | Jang | H01Q 1/526 343/842 |
| 2016/0372975 | A1* | 12/2016 | Jang | H02J 50/10 |
| 2017/0040830 | A1* | 2/2017 | Jang | H02J 7/025 |
| 2017/0053737 | A1* | 2/2017 | Kurs | H03H 7/40 |
| 2017/0104358 | A1* | 4/2017 | Song | H02J 7/025 |
| 2017/0112026 | A1* | 4/2017 | Yu | H05K 9/0081 |

FOREIGN PATENT DOCUMENTS

| | | |
|---|---|---|
| JP | 2009-5472 A | 1/2009 |
| KR | 10-2014-0065364 A | 5/2014 |
| KR | 10-2015-0048692 A | 5/2015 |
| KR | 10-2015-0048694 A | 5/2015 |
| KR | 10-2015-0065428 A | 6/2015 |

OTHER PUBLICATIONS

Korean Office Action dated Jun. 24, 2016 in counterpart Korean Application No. 10-2015-0142029 (pp. 1-6 in English; pp. 7-12 in Korean).

Korean Office Action dated Dec. 27, 2016 in counterpart Korean Patent Application No. 10-2015-0142029 (10 pages, with English translation).

* cited by examiner

WIRELESS POWER CHARGING DEVICE

CROSS-REFERENCE TO RELATED APPLICATIONS

This application claims the benefits of Korean Patent Application No. 10-2015-0111245 filed on Aug. 6, 2015 and 10-2015-0142029 filed on Oct. 12, 2015, in the Korean Intellectual Property Office, the entire disclosures of which are incorporated herein by reference for all purposes.

BACKGROUND

1. Field

The following description relates to a wireless power charging device.

2. Description of Related Art

As various types of electronic products are being miniaturized to have less volume and mass, a wireless (i.e., contactless) power charging method of charging a battery using electro/magnetic coupling without a physical electrical contact has come to prominence.

The wireless power charging method charges a reception device with power using electromagnetic induction and converts a current generated by inductive coupling between a primary coil and a secondary coil into energy to charge a battery, by installing the primary coil (i.e. transmitter coil) on a charger (i.e. wireless power transmitting apparatus) and installing the secondary coil (i.e. receiver coil) on a reception device (i.e. wireless power receiving apparatus).

An electromagnetic wave shielding sheet is generally disposed between the receiver coil and the battery. The shielding sheet serves to shield a magnetic field generated by the receiver coil from radiating to the battery and improves transmission of the electromagnetic waves generated by the wireless power transmitting apparatus to the wireless power receiving apparatus.

When wireless power charging is performed with the electromagnetic wave shielding sheet, various parasitic losses due to materials and circuits may occur while power of several to tens of watts moves continuously, such that a considerable amount of heat may be generated. Therefore, research into a method of efficiently emitting heat generated by an electromagnetic wave shielding sheet or around the electromagnetic wave shielding sheet has been actively progressing in the art.

SUMMARY

This summary is provided to introduce a selection of concepts in a simplified form that are further described below in the Detailed Description. This Summary is not intended to identify key features or essential features of the claimed subject matter, nor it is intended to be used as an aid in determining the scope of the claimed subject matter.

According to a general aspect, a wireless power charging device, includes a coil configured to transmit or receive a wireless power signal; an electromagnetic wave shielding sheet disposed proximate the coil; and, a heat radiation layer disposed on the electromagnetic wave shielding sheet.

The coil may include upper and lower covers and a coil pattern disposed between the upper and lower covers.

The heat radiation layer may be bonded to the lower cover by an adhesive layer.

The heat radiation layer may be directly bonded to the lower cover.

The heat radiation layer may be directly coated on a surface of the lower cover.

The upper cover, the lower cover, and the coil pattern may form a flexible printed circuit board structure.

The heat radiation layer may have a shape substantially corresponding to the coil pattern.

The heat radiation layer may be bonded to the coil pattern by an adhesive layer.

The heat radiation layer may be directly bonded to the coil pattern.

The heat radiation layer may be directly coated on a surface of the coil pattern.

The heat radiation layer and the coil pattern may be disposed between first and second adhesive layers and affixed thereby.

The electromagnetic wave shielding sheet may be bonded to the first adhesive layer.

The wireless power charging device may further include a cover layer bonded to the second adhesive layer.

The heat radiation layer may be bonded to the electromagnetic wave shielding sheet by an adhesive layer.

The wave shielding sheet may be electrically separated by insulative portions into longitudinal portions or laminar layers, and configured to reduce eddy currents.

The heat radiation layer may be disposed between the coil and the electromagnetic wave shielding sheet, the head radiation layer may be configured to conduct heat from both the coil and the electromagnetic wave shielding sheet.

The heat radiation layer may be graphene.

According to another general aspect, a wireless power charging device includes a resonance coil configured to transmit or receive a wireless power signal; an electromagnetic wave shielding sheet disposed substantially normal to and on an opposing side of an ingress or egress side of the wireless power signal at the resonance coil; and, a heat radiation layer disposed between the resonance coil and the electromagnetic wave shielding sheet, the heat radiation layer being configured to thermally conduct heat away from the resonance coil and the electromagnetic wave shielding sheet.

According to another general aspect, a method of forming a power charging device includes forming a conductive coil pattern; forming a heat radiation layer on the conductive coil pattern; and, adjoining the conductive coil pattern with an electromagnetic wave shielding sheet so as to capture the heat radiation layer therebetween.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
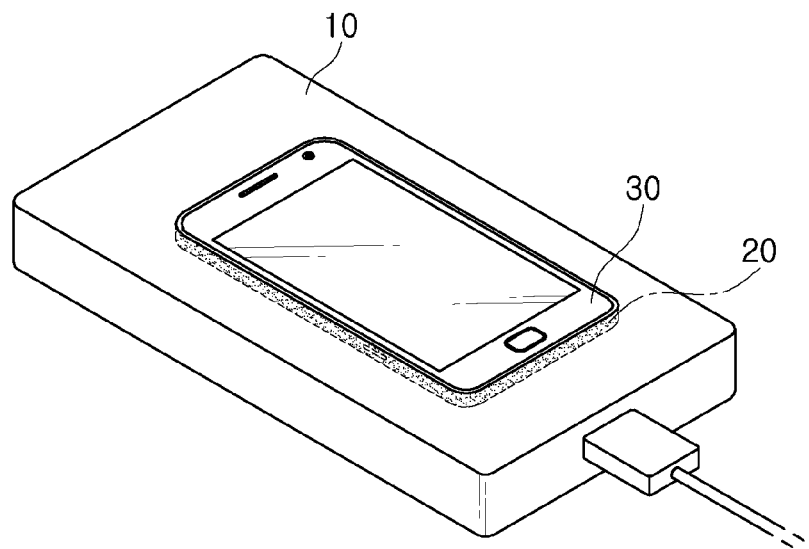
FIG. 1 is a perspective view of an example of a wireless power charging system.

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed as will be apparent to one of ordinary skill in the art, with the exception of operations necessarily occurring in a certain order. Also, descriptions of functions and constructions that are well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

Throughout the specification, it will be understood that when an element, such as a layer, region or wafer (substrate), is referred to as being "on," "connected to," or "coupled to" another element, it can be directly "on," "connected to," or "coupled to" the other element or other elements intervening therebetween may be present. In contrast, when an element is referred to as being "directly on," "directly connected to," or "directly coupled to" another element, there are no elements or layers intervening therebetween. Like numerals refer to like elements throughout. As used herein, the term "and/or" includes any and all combinations of one or more of the associated listed items.

It will be apparent that though the terms first, second, third, etc. may be used herein to describe various members, components, regions, layers and/or sections, these members, components, regions, layers and/or sections should not be limited by these terms. These terms are only used to distinguish one member, component, region, layer or section from another region, layer or section. Thus, a first member, component, region, layer or section discussed below could be termed a second member, component, region, layer or section without departing from the teachings of the embodiments.

Spatially relative terms, such as "above," "upper," "below," and "lower" and the like, may be used herein for ease of description to describe one element's relationship to another element(s) as shown in the figures. It will be understood that the spatially relative terms are intended to encompass different orientations of the device in use or operation in addition to the orientation depicted in the figures. For example, if the device in the figures is turned over, elements described as "above," or "upper" relative to other elements would then be oriented "below," or "lower" than the other elements or features. Thus, the term "above" can encompass both the above and below orientations depending on a particular direction of the figures. The device may be otherwise oriented (rotated 90 degrees or at other orientations) and the spatially relative descriptors used herein may be interpreted accordingly.

The terminology used herein is for describing particular embodiments only and is not intended to be limiting. As used herein, the singular forms "a," "an," and "the" are intended to include the plural forms as well, unless the context clearly indicates otherwise. It will be further understood that the terms "comprises," and/or "comprising" when used in this specification, specify the presence of stated features, integers, steps, operations, members, elements, and/or groups thereof, but do not preclude the presence or addition of one or more other features, integers, steps, operations, members, elements, and/or groups thereof.

Hereinafter, embodiments will be described with reference to schematic views. In the drawings, for example, due to manufacturing techniques and/or tolerances, modifications of the shape shown may be encountered. Thus, embodiments should not be construed as being limited to the particular shapes of regions shown herein, but should be understood, for example, to include a change in shape resulting from manufacturing. The following embodiments may also be constituted by one or a combination thereof.

Figure 2:
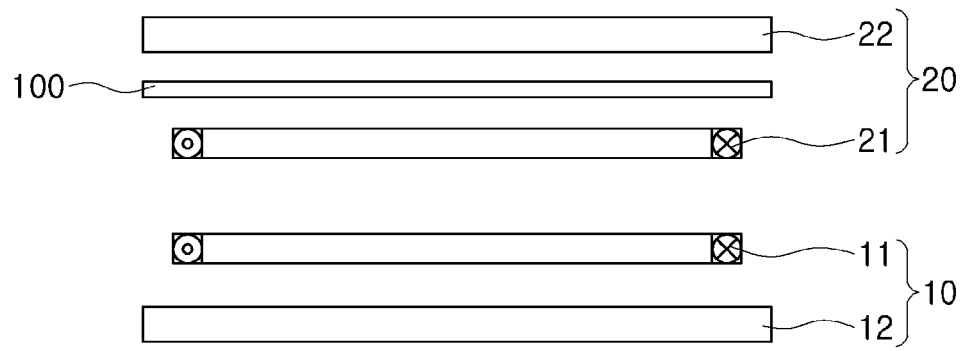
FIG. 2 is an exploded cross-sectional view of an example of internal components of FIG. 1.

FIG. 1 is a perspective view of a wireless power charging system and FIG. 2 is an exploded cross-sectional view of internal components of FIG. 1.

Referring to FIGS. 1 and 2, a general wireless power charging system includes a wireless power transmitting apparatus 10 and a wireless power receiving apparatus 20, in which the wireless power receiving apparatus 20 is included in electronics 30 such as a mobile phone, a notebook PC, a tablet PC.

Reviewing an inside of the wireless power transmitting apparatus 10, a transmitter coil 11 is disposed or formed on or in a substrate 12, and as a result, if an alternating current (AC) voltage is applied to the wireless power transmitting apparatus 10, a magnetic field is generated around the wireless power transmitting apparatus 10. Therefore, a battery 22 is able to be charged with an electromotive force induced from the transmitter coil 11 into a receiver coil 21 embedded in or disposed on the wireless power receiving apparatus 20.

The battery 22 may be, for example, a nickel hydrogen battery, lithium polymer, lithium ion, or any other suitable battery, ultra-capacitor, or combination thereof that may be charged and discharged, but is not limited thereto. Further, the battery 22 may be separately configured from the wireless power receiving apparatus 20 and thus may be detached from the wireless power receiving apparatus 20. Alternatively, the battery 22 may be integrated with the wireless power receiving apparatus 20.

The transmitter coil 11 and the receiver coil 21 may be electromagnetically bonded to each other and may be formed by winding a metal wire such as copper, aluminum, gold, silver, or other suitably conductive wire. In this case, a winding shape may be a circle, an oval, a quadrangle, a diamond, or the like and the overall size, the turn number, or the like of the transmitter coil 11 and the receiver coil 21 may be appropriately controlled to be set depending on the required characteristics such as wireless transmission rate, battery capacity C, apparatus power draw or current I, operating voltage V, battery charge rate e.g. C, C/2, C/3, 2C . . . .

The electromagnetic wave shielding sheet 100 is disposed between the receiver coil 21 and the battery 22 to collect magnetic flux to allow the receiver coil 21 to effectively receive the collected magnetic flux. In addition, the electromagnetic wave shielding sheet 100 is configured to block at least a portion of the magnetic flux from being radiated towards the battery 22 rather than arriving at the receiver coil 21.

The electromagnetic wave shielding sheet 100 may be applied to the receiver of the foregoing wireless power charging device while being bonded to the coil part. Further, in addition to the wireless power charging device, the coil part may also be used for magnetic security transmission (MST), near field communication (NFC). Further, the electromagnetic wave shielding sheet 100 may also be applied to the transmitter of the wireless power charging device, rather than solely the receiver of the wireless power charging device. Hereinafter, both of the transmitter coil and the receiver coil may be termed the coil part.

Figure 3:
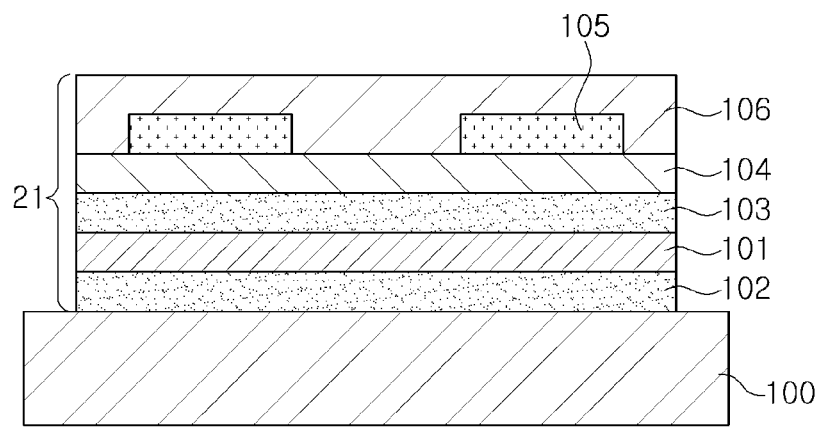
FIG. 3 is a cross-sectional view schematically illustrating a structure of a coil part and an electromagnetic wave shielding sheet in accordance with an embodiment.

Referring to FIG. 3, a structure of the coil part and the electromagnetic wave shielding sheet are further described below. As described above, the structure may also be adopted in the transmitter. As shown in FIG. 3, according to an embodiment, the wireless power charging device includes the electromagnetic wave shielding sheet 100 and the coil part 21, in which the coil part 21 includes a heat radiation layer 101 disposed on the electromagnetic wave shielding sheet 100.

The electromagnetic wave shielding sheet 100 performing a function of collecting and shielding the battery from the electromagnetic waves may use a thin metal ribbon formed of, for example, an amorphous alloy, a nano-crystalline alloy, or the like. In this case, as the amorphous alloy, an Fe-based alloy or a Co-based magnetic alloy may be used. As the Fe-based magnetic alloy, a material including Si, for example, an Fe—Si—B alloy may be used. Here, the higher the content of metals in addition to Fe, the higher the saturated magnetic flux density, but when a content of an element of Fe is excessive, it is difficult to form the amorphous alloy. Therefore, the content of Fe is within a range of about 70 to about 90 atomic % and considering the amorphous formation possibility, a sum of Si and B may be in a range of about 10 to about 30 atomic %. To prevent or reduce corrosion, corrosion resistance elements of about 20 atomic % such as Cr and Co may be added to the base composition and to give other characteristics, if necessary, a small quantity of other metal elements may be added to the base composition.

In a case of a nano-crystalline alloy, for example, the Fe-based nano-crystalline magnetic alloy may be used. As the Fe-based nano-crystalline alloy, an Fe—Si—B—Cu—Nb alloy may be used.

The electromagnetic wave shielding sheet 100 may be provided in the integrated form but may have a structure fractured or separated into a plurality of pieces. The fractured structure may provide electrical insulation between the plurality of pieces to contribute to a reduction in eddy currents that may be generated in the electromagnetic wave shielding sheet 100.

Further, the electromagnetic wave shielding sheet 100 may also be provided in a form in which a plurality of magnetic layers are stacked, depending on the required shielding performance or a size, a design, or the like of electronics and the plurality of magnetic layers may be bonded to each other by an adhesive layer such as a double-sided tape.

Next, describing the structure of the coil part 21, the coil part 21 may include an upper cover 106 and a lower cover 104 and a coil pattern 105 which is disposed between the upper cover 106 and the lower cover 104. In the case of the present embodiment, the upper cover 106 and the lower cover 104 may be formed of materials such as polyimide and may have a flexible printed circuit board (FPCB) structure along with the coil pattern 105. Further, the upper cover 106 and the lower cover 104 may also be formed integrally.

The heat radiation layer 101 is provided to effectively radiate heat generated by the coil pattern 105, the electromagnetic wave shielding sheet 100, or the like during operations of the wireless power charging device and, as shown in FIG. 3, the heat radiation layer 101 may be bonded to the lower cover 104 and the electromagnetic wave shielding sheet 100. For example, among heat generated during the transmission of power to the coil pattern 105, a considerable quantity of heat may be generated due to a direct current resistance component of the coil pattern 105. In this case, the heat radiation layer 101 may effectively radiate heat, such that the temperature of the wireless power charging device may be lowered. In this case, the heat radiation layer 101 may be bonded to the lower cover 104 by the adhesive layer 103. As an example of the adhesive layer 103, various materials such as a tackifier like double-sided tape or an adhesive such as a metallic or other thermally conductive paste may be used. Similarly, the heat radiation layer 101 may be bonded to the electromagnetic wave shielding sheet 100 by the adhesive layer 102.

According to an embodiment, the heat radiation layer 101 includes a material having suitable thermal conductivity while being suitable to be applied to both the coil part 21 and the electromagnetic wave shielding sheet 100. An example of the material may include graphene. That is, the heat radiation layer 101 may have a film form including graphene and thus may be bonded to the electromagnetic wave shielding sheet 100 and the lower cover 104 by the adhesive layers 102 and 103.

According to an embodiment, the graphene included in the heat radiation layer 101 is a new material having a two-dimensional structure formed of one layer while having a repeating honeycomb shape in which carbon atoms are sp2-hybridization bonded. It is known that the graphene is a conductor that is very stable and is excellent structurally and chemically and may move electrons about 100 times as fast as silicon and make a current flow about 100 times as fast as copper. Further, the graphene may have mechanical strength and flexibility about 200 times as high as steel and may also have optical properties that transmit 97.7% of incident light while having heat conductivity of about 5,300 W/m·K. Further, graphene may be formed only of carbon, and therefore may have a high specific surface area of 2,600 m2/g.

Figure 4:
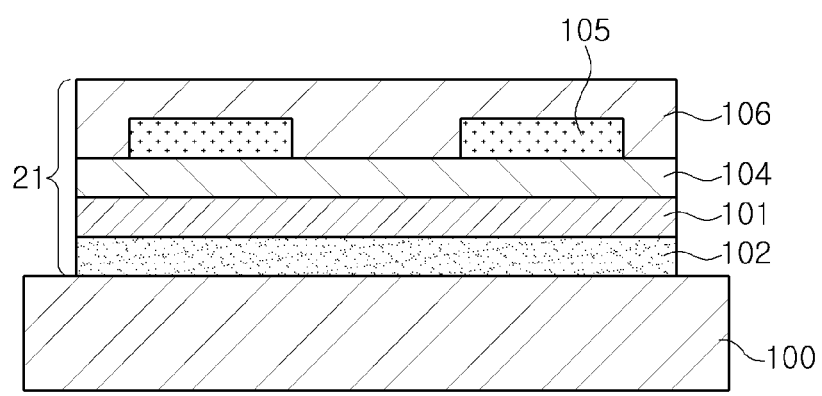
FIG. 4 is a diagram illustrating a modified example of FIG. 3.

To further improve the heat radiation performance, as shown in a modified example of FIG. 4, the heat radiation layer 101 is directly bonded to the lower cover 104, in detail, the heat radiation layer 101 may be directly coated on a surface of the lower cover 104. That is, the heat radiation layer 101 is directly formed on the surface of the lower cover 104 without using the adhesive layer 103, or the like, and may obtain an excellent heat radiation effect due to the direct coating structure. Further, the heat radiation layer 101 need not have an adhesive, such that the overall size of the receiver may be reduced.

Although not shown in FIG. 4, to more effectively emit the heat generated by the coil pattern 105, the lower cover 104 may be removed. In this case, the heat radiation layer 101 is directly formed on the surface of the coil pattern 105. In addition, the adhesive layer 102 between the heat radiation layer 101 and the electromagnetic wave shielding sheet 100 may also be removed and therefore the heat generated by the electromagnetic wave shielding sheet 100 may be directly transferred to the heat radiation layer 101. By this structure, the heat radiation performance may be yet further improved and a more compact apparatus may be implemented.

As a method of forming a coating layer on the surface of the electromagnetic wave shielding sheet 100, the lower cover 104, the coil pattern 105, or the like using a graphene powder, various methods such as a spin coating method, a spray coating method, a vacuum filtrating method, a Langmuir-Blodgett assembly method, a layer-by-layer (LBL) assembly method, a dipping method, a roll coating method, and a comma coating method may be used. In the case of using the foregoing methods, the surface of the electromagnetic wave shielding sheet 100, the lower cover 104, the coil pattern 105, may be coated with the graphene powder mixed with an organic or inorganic binder. Hereinafter, some of the foregoing methods will be described.

The spin coating method is a coating method of applying a predetermined amount of graphene oxide solution to a substrate and quickly rotating the substrate, that is, an object to be coated (magnetic layer in an embodiment) to coat the substrate with a centrifugal force applied to the solution.

The spray coating method, a coating method of injecting a graphene oxide solution onto a substrate, may coat a large-area substrate and may be quickly performed. However, the spray coating method may cause an aggregation phenomenon of graphene oxide pieces before the solution injected from a nozzle contacts the substrate to make the overall area of the film non-uniform.

The vacuum filtrating method is a coating method of forming a film in graphene oxide pieces filtered by micro filtering paper when the graphene oxide solution is filtered by the micro filtering paper and may obtain the uniformly coated film and allow for relatively precise control of a thickness of the film. However, the vacuum filtrating method may have a problem in that a considerable quantity of graphene oxide solution may be consumed and a time required to consume the graphene oxide solution may be relatively longer.

The Langmuir-Blodgett assembly method is a coating method of vertically dipping a substrate in a solution having graphene oxides arranged on a surface thereof and then slowly raising the substrate at a constant speed to self-assemble the graphene oxide pieces with the substrate. The Langmuir-Blodgett assembly method may obtain a relatively uniform film but may have a problem in that a time required to perform the process is longer and it is difficult to coat large-area substrates.

The layer-by-layer (LBL) assembly method is a coating method of giving different surface charges to graphene pieces and assembling a film using electrostatic attraction. The LBL assembly method may attach a functional group to the graphene pieces to prepare the graphene oxide solution having a positive charge and the graphene oxide solution having a negative charge, respectively, and alternately dipping the substrate in the two solutions, to pile up the graphene oxide pieces layer by layer. The LBL assembly method may have good operability but may require a pre-processing process of attaching the function group to the graphene pieces and may increase the required amount of graphene oxide solution and time.

Figure 5:
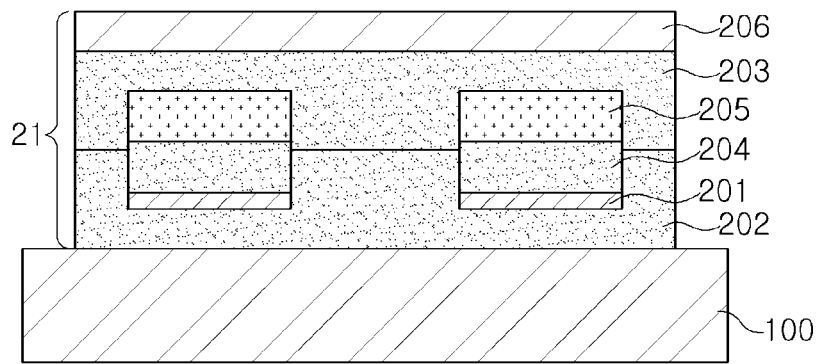
FIGS. 5 and 6 are cross-sectional views schematically illustrating a structure of a coil part and an electromagnetic wave shielding sheet, in accordance with another embodiment.
Figure 6:
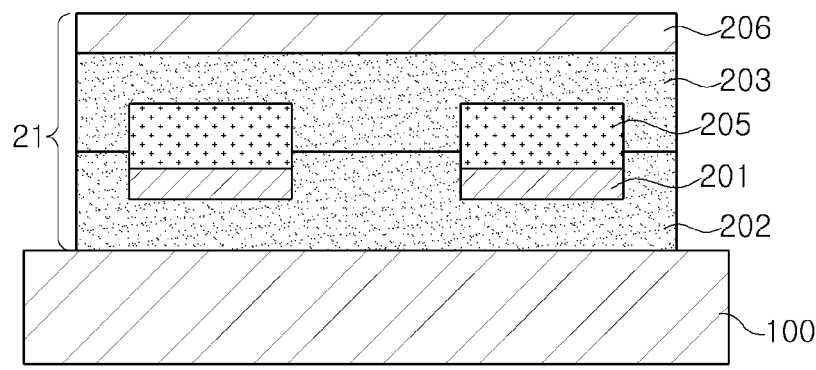
Figure 7:
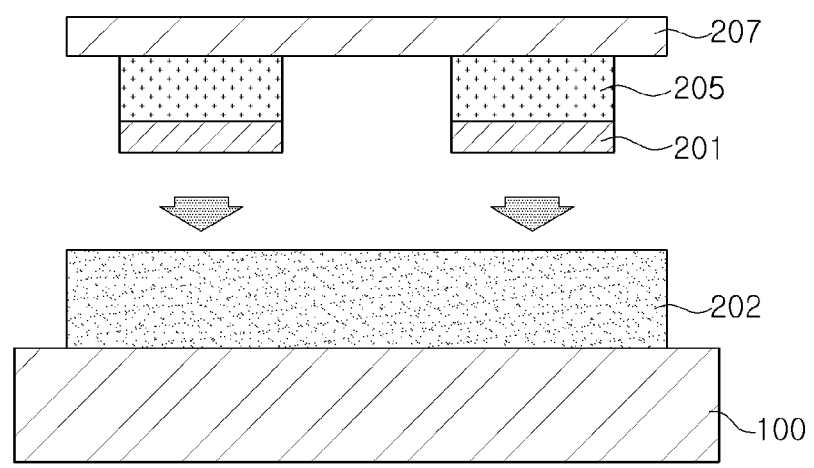
FIG. 7 is a cross-sectional view schematically illustrating a portion of a method of manufacturing a wireless power charging device, in accordance with an embodiment.

As shown in FIGS. 5 through 7, an embodiment of a wireless power charging device is shown. Referencing FIG. 5, the coil part 21 includes a heat radiation layer 201 disposed on the electromagnetic wave shielding sheet 100. The wireless power charging device shown in FIG. 5 may have a difference in a shape of the heat radiation layer 201 and detailed components of the coil part 21.

According to an embodiment, as shown in FIG. 5, the heat radiation layer 201 has a shape substantially corresponding to the coil pattern 205. That is, the heat radiation layer 201 is formed in an area corresponding to a lower portion of the coil pattern 205. The heat radiation layer 201, formed of graphene, may not be formed in the overall area of the coil part 21 but, instead in the area corresponding to the coil pattern 205, to thereby reduce an effect on the magnetic field formed in the coil pattern 205 while maintaining the heat radiation performance. In this case, the heat radiation layer 201 is bonded to the coil pattern 205 by the adhesive layer 204. The coil pattern 205 and the heat radiation layer 201 may be electrically connected to each other and the higher the electric conductivity of the heat radiation layer 201, the better the heat radiation layer 201. For this purpose, an adhesion material that may increase a fraction of the graphene in the heat radiation layer 201 or having suitable electric conductivity as the adhesive layer 204 may be used.

However, similar to the foregoing embodiments, as shown in the example of FIG. 6, the heat radiation layer 201 is directly bonded to the coil pattern 205. The heat radiation layer 201 is directly coated on the surface of the coil pattern 205 to further improve the heat radiation efficiency and facilitate the miniaturization of the apparatus. The method of directly forming a heat radiation layer 201 on a surface of a coil pattern 205 may refer to the examples of the methods described above.

Describing another configuration, as shown in FIGS. 5 and 6, the heat radiation layer 201 and the coil pattern 205 may be disposed between first and second adhesive layers 202 and 203, and thus may be provided in a fixed form. As an example of the first and second adhesive layers 202 and 203, the double-sided tape, or other suitable adhesive may be used. By the structure, the electromagnetic wave shielding sheet 100 may be bonded to the first adhesive layer 202. Further, the cover layer 206 may be formed on the second adhesive layer 203 and the cover layer 206 may be formed of a material such as PET.

Meanwhile, an example of a method of making the structure shown in FIGS. 5 and 6 will be described with reference to FIG. 7. First, in the case of the structure of FIG. 6, a carrier 207 on which a conductive thin film (for example, copper foil) is formed may be prepared. Here, the conductive thin film forms the coil pattern 205 by punching. Next, the coil pattern is formed by directly coating the heat radiation layer 201 on a surface of the conductive thin film. Compared to the case of using a tackifier or an adhesive, in the case of directly coating the heat radiation layer on the copper foil, a punched coil may be manufactured more precisely and may be more hard. Further, since there is no an adhesion layer that has reduced heat and electrical conductivity, it may substantially improve electrical and magnetic properties. Next, the structure of the coil pattern 205 bonded to the heat radiation layer 201 may be obtained by simultaneously punching the copper foil and the heat radiation layer 201. Next, as shown in FIG. 7, the coil pattern 205 and the heat radiation layer 201 may be transferred onto the electromagnetic wave shielding sheet 100 to which the adhesive layer 202 is applied and then the cover layer 206, formed of PET, may be bonded to the adhesive layer 203 by an adhesive, or the like, to obtain the structure shown in FIG. 6.

As another method, a method of directly forming a coil pattern 205 on a cover layer 206 is described. First, the conductive thin film (for example, copper foil) may be bonded to the cover layer 206, formed of PET, by the adhesive layer 203 such as the double-sided tape. Next, the heat radiation layer 201 such as the graphene sheet may be bonded to the conductive thin film. Also, the coil pattern (if necessary, simultaneously with NFC and MST coils) and the heat radiation layer 201 may be formed simultaneously by the punching. In this case, since a line width and an inter-line distance of the coil are as fine as tens to hundreds of μm, the bonding by the adhesive may be more preferable than that by the tackifier such as the double-sided tape. Hereinafter, as described above, the coil pattern 205 and the heat radiation layer 201 may be appropriately bonded to the electromagnetic wave shielding sheet 100.

Although the foregoing embodiments describe that the electromagnetic wave shielding sheet is applied to the receiver of the wireless power charging device, the electromagnetic wave shielding sheet may also be applied to the transmitter of the wireless power charging device.

As set forth above, according to the wireless power charging device in accordance with the embodiments, the heat radiation layer may be applied between the coil part and the electromagnetic wave shielding sheet to substantially improve the heat radiation characteristics, thereby improving the reliability of electronics using the wireless power charging device. Further, it is possible to further improve the heat radiation performance and reduce the size of the wireless power charging device by directly coating the heat radiation layer on the cover, the coil pattern, the electromagnetic wave shielding sheet, or the like.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A wireless power charging device, comprising:
a coil configured to transmit or receive a wireless power signal;
an electromagnetic wave shielding sheet disposed proximate the coil; and
a heat radiation layer disposed between the electromagnetic wave shielding sheet and the coil, wherein the heat radiation layer and the coil are embedded within a first and second adhesive layer, respectively,
wherein the coil comprises upper and lower covers and a coil pattern disposed between the upper and lower covers,
wherein the heat radiation layer has a shape substantially corresponding to the coil pattern, and
wherein the heat radiation layer comprises graphene.

2. The wireless power charging device of claim 1, wherein the upper cover, the lower cover, and the coil pattern form a flexible printed circuit board structure.

3. The wireless power charging device of claim 1, wherein the heat radiation layer is bonded to the coil pattern by an adhesive layer.

4. The wireless power charging device of claim 1, wherein the heat radiation layer is directly bonded to the coil pattern.

5. The wireless power charging device of claim 4, wherein the heat radiation layer is directly coated on a surface of the coil pattern.

6. The wireless power charging device of claim 1, wherein the electromagnetic wave shielding sheet is bonded to the first adhesive layer.

7. The wireless power charging device of claim 1, further comprising:
a cover layer bonded to the second adhesive layer.

8. The wireless power charging device of claim 1, wherein the heat radiation layer is bonded to the electromagnetic wave shielding sheet by the first adhesive layer.

9. The wireless power charging device of claim 1, wherein the wave shielding sheet is electrically separated by insulative portions into longitudinal portions or laminar layers, and configured to reduce eddy currents.

10. The wireless power charging device of claim 1, wherein the heat radiation layer is disposed between the coil and the electromagnetic wave shielding sheet, the heat radiation layer being configured to conduct heat from both the coil and the electromagnetic wave shielding sheet.

11. The wireless power charging device of claim 1, wherein the heat radiation layer comprises a two-dimensional structure formed of one layer having a repeating honeycomb shape.

12. The wireless power charging device of claim 11, wherein the heat radiation layer comprises carbon atoms sp2-hybridization bonded.

13. The wireless power charging device of claim 1, wherein the heat radiation layer and the coil contact each other, are affixed between the first and second adhesive layers, and are embedded in the first and second adhesive layers.

14. A wireless power charging device, comprising:
a resonance coil configured to transmit or receive a wireless power signal;
an electromagnetic wave shielding sheet disposed substantially normal to and on an opposing side of an ingress or egress side of the wireless power signal at the resonance coil; and,
a heat radiation layer disposed between the resonance coil and the electromagnetic wave shielding sheet, the heat radiation layer being configured to thermally conduct heat away from the resonance coil and the electromagnetic wave shielding sheet, wherein the heat radiation layer and the resonance coil are embedded within a first and second adhesive layer, respectively,
wherein the resonance coil comprises upper and lower covers and a coil pattern disposed between the upper and lower covers,
wherein the heat radiation layer has a shape substantially corresponding to the coil pattern, and
wherein the heat radiation layer comprises graphene.

15. A method of forming a power charging device, comprising:
forming a conductive coil pattern;
forming a heat radiation layer on the conductive coil pattern;
embedding the heat radiation layer and the conductive coil pattern within a first and second adhesive layer, respectively; and adjoining the conductive coil pattern with an electromagnetic wave shielding sheet so as to capture the heat radiation layer therebetween,
wherein the heat radiation layer has a shape substantially corresponding to the coil pattern, and
wherein the heat radiation layer comprises graphene.

\* \* \* \* \*